United States Patent [19]

Sosnowski

[11] 4,382,886
[45] May 10, 1983

[54] METHOD FOR EXTRACTING PROPOLIS AND WATER SOLUBLE DRY PROPOLIS POWDER

[76] Inventor: Zenon M. Sosnowski, 1081 Beauty Ave., Winnipeg, Manitoba, Canada, R2P OE9

[21] Appl. No.: 253,170

[22] Filed: Apr. 13, 1981

[51] Int. Cl.$^3$ .................. C08L 93/00; A61K 17/00
[52] U.S. Cl. ............................. 260/107; 424/95; 424/195; 6/1
[58] Field of Search ............... 260/107; 424/195, 95

[56] References Cited

FOREIGN PATENT DOCUMENTS

| 2347030 | 7/1978 | France . |
| 48101 | 11/1967 | Romania . |
| 1465194 | 2/1977 | United Kingdom . |
| 232470 | 12/1968 | U.S.S.R. . |
| 267014 | 4/1970 | U.S.S.R. . |
| 585846 | 10/1975 | U.S.S.R. . |
| 576115 | 10/1977 | U.S.S.R. . |

OTHER PUBLICATIONS

American Bee Journal, Nov. 1976, pp. 512, 513 and 542.
Condensed Chemical Dictionary, 5th Ed., Reinhold, N.Y., (1956), p. 145.
Schneidewind et al, Chem. Abs. 84, 86747t Pharmazie 1975, 30(12), 803.
Propavko, Chem. Abs. 74, 10749t, 22nd Inst. BeeKeep. Summ. 1969, 163–164.
Computer Search, Chem. Abs. 1967–1976, (Propolis).
M. Vosnjak, The Miracle of Propolis, Thorsons Publ. Ltd., Wellingborough, Northhamptonshire (U.K.), 1978.

*Primary Examiner*—H. S. Cockeram
*Attorney, Agent, or Firm*—Duckworth, Allen, Dyer & Pettis

[57] ABSTRACT

A new and useful method for extracting propolis from substantially clean raw material to obtain a dry propolis powder. Depending upon the method employed, either a water soluble propolis powder or an organic soluble propolis powder may be obtained. A unique method for purifying the propolis extract is also disclosed. Both the methods for extracting propolis-containing raw material and the water soluble dry propolis powder are claimed. The propolis powder exhibits, among other things, bactericidal viricidal, analgesic, anaesthetic and regenerative properties.

20 Claims, No Drawings

METHOD FOR EXTRACTING PROPOLIS AND WATER SOLUBLE DRY PROPOLIS POWDER

BACKGROUND OF THE INVENTION

1. Field of the Invention

The present invention relates to a new method for extracting propolis from clean raw propolis as well as unprocessed beeswax to obtain a dry propolis powder. In addition, the invention includes a unique water soluble dry propolis powder. Propolis is a resinous compound collected by honey bees from various plants and the buds of different trees. Propolis is also known as "honey bee glue" and is used by the bees to coat parts of the interior of the hive and to seal the cracks and crevices of the hive.

2. Description of the Prior Art

The existence of propolis, or honey bee glue, has of course long been recognized by apiarists. In fact, it has been variously described as both a blessing and a curse. While the substance has been largely ignored as a necessary, sticky evil associated with beekeeping, some rather surprising studies of propolis have been made with particular regard to commercial and therapeutic uses for the material. Most of the research has been conducted in Asian and European countries, but potential commercial uses for propolis have been acknowledged in the United States.

In a relatively brief article authored by Dr. F. B. Wells and published in the November, 1976 issue of the American Bee Journal at pages 512, 513 and 542, the potential for use of propolis and propolis-containing preparations for therapeutic purposes is outlined. As is indicated in that article, and the foot notes to the article, the majority of research on propolis has been undertaken in Great Britain, Denmark, Poland, Russia, Romania, Czechoslovakia, East Germany, Yugoslavia and Bulgaria. These reports are in general agreement that raw propolis consists essentially of approximately 55% resins and balsams, 30% wax, 10% ethereal oils and 5% pollen. However, it will be appreciated that the composition of propolis may vary and is dependent upon its geographic area and the season of its collection. Nevertheless, reported laboratory and clinical tests are quite consistent in their observations that propolis and propolis-containing compositions do exhibit bactericidal effects. It has been suggested that propolis may be responsible for the relatively low concentration of bacteria and molds in the atmosphere within bee hives. As early as 1965 three Romanian investigators reported that alcoholic extracts of propolis, drones and royal jelly had virulicidal activity against Type A influenza virus in vitro. Russian Pat. No. 267014 claims the efficacy of an alcoholic extract of propolis in combination with glycerin for treating conjunctivitis. Russian Pat. No. 232470 discloses and claims an alcoholic extract of propolis as part of a toothpaste composition possessing both prophylactic and antiseptic properties. Romania Pat. No. 48101 relates to a cosmetic lotion including an alcoholic extract of propolis also including boric acid. British Pat. No. 1,465,194 teaches a method comprising repetitive freezing and thawing of propolis to obtain a material suitable for subsequent therapeutic uses.

Thus, one must clearly admit that the preparation of alcoholic extracts containing propolis is well known and, further, that organic solvents are normally used to prepare the extracts. In fact, as the literature clearly teaches, ethyl alcohol might be termed the universally-accepted solvent. On the other hand, one must also admit that the literature is quite lacking in that it fails to teach controlled, reproducible methods for extracting propolis of known constituent composition. There is virtually no teaching in the prior art of any means for obtaining a water soluble propolis extract, and the literature repeatedly refers to propolis as being substantially insoluble.

It is therefore apparent that there is a great need in the art for a method of obtaining a substantially pure propolis extract of known and reproducible constituent composition. Furthermore, due to the recognized potential for using propolis extracts for therapeutic purposes, it would be extremely desirable if a water soluble extract could be obtained. It is therefore a purpose of this invention to provide a new extraction and purification process which is reproducible to obtain a dry propolis powder of known and relatively constant composition. A further object of the present invention resides in a method for obtaining a water soluble dry propolis powder which has heretofore not been reported.

SUMMARY OF THE INVENTION

The present invention relates to a method for extracting propolis as well as for purifying the propolis extract to obtain a dry propolis powder suitable for a variety of uses including, but not necessarily limited to, cosmetic and therapeutic application. The invention further relates to a method for obtaining a water soluble dry propolis powder and the water soluble propolis powder itself. Accordingly, the present invention comprises a method for extracting the propolis using both organic solvents, aqueous solutions of organic solvents, and mixtures thereof. It is to be understood that the particular solvent utilized in the extraction method will be chosen with regard to the intended end use of the dry propolis powder and whether or not it is desired that the powder be water soluble or organic solvent soluble.

The procedure for preparing the dry propolis powder is first to obtain a quantity of raw material consisting essentially of either clean raw propolis or unprocessed beeswax. The raw material is preferably placed in an amber glass container and covered with solvent. If clean raw propolis is used as the raw material, about 2 liters of solvent are added per kilogram of propolis. If unprocessed beeswax is used as the raw material, about 3 liters of solvent are used per kilogram of beeswax.

As will be set forth in greater detail hereinafter, preferred solvents for use in the method of this invention are absolute ethanol (ethyl alcohol) and aqueous solutions of ethyl alcohol. However, laboratory experimentation has revealed that the following organic solvents, as well as aqueous solutions of these solvents, may be used:

isopropyl alcohol
  n-butyl alcohol
  sec-butyl alcohol
  tert-butyl alcohol
  ethyl ether
  benzyl alcohol
  propylene glycol
  dimethyl sulfoxide
  ethylene glycol
  n-propyl alcohol
  methyl alcohol
  benzyl benzoate
  acetone polyethylene glycol and
glacial acetic acid.

It is of course to be understood that the solvent utilized should be of high quality and purity, consistent with the final uses of the dry propolis powder.

While the initial extraction preferably takes place at room temperature, acceptable results are given at temperatures from about 0° C. to about 37° C. The extracting vessel containing the raw material and solvent is shaken several times daily for a period of from one to ten days, preferably at least three days. At the end of this time, the extract is filtered through Whatman No. 1 filter paper, or its equivalent. At this point it should be noted that the once extracted raw material may be again covered with solvent and re-extracted as described above to obtain additional propolis-containing filtrates.

The solvent may then be removed from the propolis-containing filtrate to yield a dry propolis powder. Removal of the solvent may be accomplished by lyophilization or incubation (evaporation). Depending upon the solvent used in carrying out the extraction method, the resulting dry propolis powder will be either water soluble or organic solvent soluble.

For example, if ethyl alcohol is used as the solvent, an organic solvent soluble propolis powder will be obtained. However, if a 10%–25% aqueous ethyl alcohol solution is used as the solvent, water soluble dry propolis powder will be obtained.

This invention may further comprise a method for purifying the propolis extract prior to obtaining the final dry propolis powder. Purification comprises cooling the propolis-containing filtrate to a temperature of at most about −20° C. for approximately 24 hours. At the end of this period the extract will become viscous and opaque. While maintaining the filtrate at about −20° C. it is shaken and filtered through Whatman No. 50 filter paper, or its equivalent. During the cold filtration procedure, which is carried out at about −20° C., a very clear filtrate should be obtained, and the waxy material remaining on the filter paper contains waste materials. If the filtrate is not clear, the procedure of cold filtration must be repeated.

The clear filtrate resulting from the cold filtration process may be filtered at the reduced temperature or may be brought to room temperature and filtered through a 0.2 micron filtration system. The solvent is then removed from this final filtrate as by lyophilization or incubation to obtain the purified dry propolis powder. In light of the relatively low temperatures utilized in the purification method outlined above, it is to be understood that this purification method is not suitable for aqueous solvent solutions, since the water would freeze.

While the above procedure has consistently proved to yield an extremely pure dry propolis powder of consistent composition, further quality control over the final powdered product may be obtained in the following fashion. After the cold filtration process described above, but prior to removing the solvent, the cold process filtrate may be brought to an extremely low temperature such as, for example, −70° C. If, after about 24 hours at that temperature, the filtrate is still clear, purity of the final product is assured. Any cloudiness in such a sample would indicate the unacceptability of the filtrate for further processing.

Detailed examples of various extraction and purification methods in accord with this invention are presented below. Also as will be set forth in greater detail hereinafter, the resulting dry propolis powder may be utilized as a constituent in many cosmetic and therapeutic substances.

The invention accordingly comprises the several steps and the relation of one or more of such steps with respect to each of the others, and the composition possessing the features, properties and the relation of constituents which are exemplified in the following detailed description, and the scope of the invention will be indicated in the claims.

DETAILED DESCRIPTION

The following examples are set forth in order to fully describe the method for extracting and purifying propolis as well as the resulting dry propolis powder and its uses.

EXAMPLE I

About 500 grams of clean raw propolis was placed in an amber glass container and covered with about 1 liter of absolute ethanol. This mixture was allowed to sit for ten days at room temperature with periodic agitation several times each day. At the end of ten days, the mixture was filtered through Whatman No. 1 filter paper. The resulting propolis-containing filtrate was then incubated at about 70° C. until a dry propolis powder was obtained. Incubation temperatures as low as about 55° C. may also be employed, but greater time to obtain the final dry product will be required. Care should be taken, however, with regard to any increase of the drying temperature, for the propolis will burn at about 80° C.

The dry material remaining after incubation is the dry propolis powder, and is organic solvent soluble.

EXAMPLE II

The method of Example I was repeated; however, the solvent was removed from the propolis-containing filtrate by lyophilization (freeze drying) after partial reduction of the alcohol content by evaporation. The final product obtained by this method was not a powder, but a "gummy" propolis residue.

EXAMPLE III

The method of Example II was repeated utilizing a 15% aqueous ethanol solution as the solvent. This resulted in a dry propolis powder which was water soluble. Chemical analysis of the water soluble dry propolis powder gave the following results per 100 grams of dry propolis powder:

| | |
|---|---|
| Calcium | 0.33 grams |
| Phosphorous | 0.111 grams |
| Albumin | 3.7 grams |
| Protein | 18.5 grams |
| Creatinine | 118.5 milligrams |
| Billirubin | 55.5 milligrams |
| Glucose | 26.1 grams |
| Alkaline Phosphatase | 4,148 International Units |
| Potassium | 0.397 grams |
| Sodium | 0.085 grams |
| Zinc | 0.299 milligrams |
| Vitamin $B_{12}$ (estimation) | 0.133 milligrams |
| Folic Acid (estimation) | 1.926 milligrams. |

Furthermore, study resulting from application of the resulting water soluble propolis to smooth muscle tissue revealed that this propolis contained no antihistamine properties quite unlike most drugs used today for treating virus symptoms. The presence of creatinine, bilirubin and alkaline phosphatase in the dry propolis powder is quite remarkable and may provide the basis for other uses of the powder, since these are normally found in animal tissue.

EXAMPLE IV

The method of Example III was repeated utilizing a 10% aqueous ethanol solution as the solvent. The results of this procedure were substantially identical to those of Example III.

EXAMPLE V

The method of Example III was repeated utilizing a 20% aqueous ethanol solution as the solvent. The results of this procedure were substantially identical to those of Example III.

EXAMPLE VI

The method of Example III was repeated utilizing a 25% aqueous ethanol solution as the solvent. The results of this procedure were substantially identical to those of Example III.

EXAMPLE VII

The method of Example III was repeated utilizing a 30% aqueous ethanol solution as the solvent. The propolis-containing filtrate derived according to this method was deemed unsuitable because of excessive cloudiness. It is therefore believed that water soluble dry propolis powder may only be obtained using aqueous solvent solutions of no more than about 25% concentration.

EXAMPLE VIII

About 500 grams of clean raw propolis were placed in an amber glass container and covered with about 1 liter of absolute ethanol. The mixture was allowed to sit at room temperature for about ten days with shaking several times each day. At the end of the ten days the extract was filtered through Whatman No. 1 filter paper.

To further purify the propolis-containing filtrate, it was cooled to a temperature of about −20° C. for about 24 hours. At the end of this period it was observed that the extract had become viscous and opaque. The chilled filtrate was then shaken and filtered while maintaining the temperature at about −20° C., through Whatman No. 50 filter paper. This resulted in a very clear purified propolis-containing filtrate. The solvent was removed from the purified filtrate by incubation at about 70° C. for approximately 48 hours, or until dry. The resulting material was organic solvent soluble dry propolis powder.

EXAMPLE IX

Utilizing about 100 grams unprocessed beeswax as the raw material and about 300 ml ethanol as the solvent, the method of Example VIII was repeated and yielded similar results. Of course, a smaller quantity of purified dry propolis powder was obtained.

EXAMPLE X

The method of Example VIII was repeated; however, the solvent was removed from the purified filtrate by lyophilization. Chemical analysis of the final product obtained according to this procedure yielded results substantially identical to those reported above in Example II.

EXAMPLE XI

The method of Example VIII was repeated utilizing isopropyl alcohol as the solvent. Equivalent results were obtained.

EXAMPLE XII

The method of Example VIII was repeated utilizing n-butyl alcohol as the solvent. The results of this procedure were substantially identical to those of Example VIII.

EXAMPLE XIII

The method of Example VIII was repeated utilizing sec-butyl alcohol as the solvent. The results of this procedure were substantially identical to those of Example VIII.

EXAMPLE XIV

The method of Example VIII was repeated utilizing tert-butyl alcohol as the solvent. The results of this procedure were substantially identical to those of Example VIII.

EXAMPLE XV

The method of Example VIII was repeated utilizing ethyl ether as the solvent. The results of this procedure were substantially identical to those of Example VIII.

EXAMPLE XVI

The method of Example VIII was repeated utilizing benzyl alcohol as the solvent. The results of this procedure were substantially identical to those of Example VIII.

EXAMPLE XVII

The method of Example VIII was repeated utilizing propylene glycol as the solvent. The results of this procedure were substantially identical to those of Example VIII.

EXAMPLE XVIII

The method of Example VIII was repeated utilizing dimethyl sulfoxide as the solvent. The results of this procedure were substantially identical to those of Example VIII.

EXAMPLE XIX

The method of Example VIII was repeated utilizing ethylene glycol as the solvent. The results of this procedure were substantially identical to those of Example VIII.

EXAMPLE XX

The method of Example VIII was repeated utilizing n-propyl alcohol as the solvent. The results of this procedure were substantially identical to those of Example VIII.

EXAMPLE XXI

The method of Example VIII was repeated utilizing methyl alcohol as the solvent. The results of this procedure were substantially identical to those of Example VIII.

EXAMPLE XXII

The method of Example VIII was repeated utilizing benzyl benzoate as the solvent. The results of this procedure were substantially identical to those of Example VIII.

EXAMPLE XXIII

The method of Example VIII was repeated utilizing acetone as the solvent. The results of this procedure were substantially identical to those of Example VIII.

EXAMPLE XXIV

The method of Example VIII was repeated utilizing polyethylene glycol as the solvent. The results of this procedure were substantially identical to those of Example VIII.

EXAMPLE XXV

The method of Example I was repeated utilizing glacial acetic acid as the solvent. The results of this procedure were substantially identical to those of Example I.

EXAMPLE XXVI

The method of Example VIII was repeated utilizing a mixture of equal parts of ethyl alcohol and methyl alcohol as the solvent. The results of this procedure were substantially identical to those of Example VIII.

EXAMPLE XXVII

The following procedures were conducted in order to determine the bactericidal activity of the purified propolis powder obtained in accord with the procedures set forth above in Example VIII.

A 10%, by weight, dry propolis powder solution in absolute ethanol was prepared. This 10% solution was then used to prepare a variety of additional solutions, diluted with distilled water, to give final concentrations of dry propolis powder of from less than 10 milligrams to 10 milligrams of propolis powder per milliliter of solution. These solutions were then again diluted with a microbiological culture medium such as supplemented peptone broth II obtained from The Becton-Dickinson Corporation of Rutherford New Jersey, U.S.A. The final solutions with peptone broth II varied from less than 1 to 10 milligrams of propolis per milliliter of peptone broth II solution. After about 24–48 hours incubation at about 37° C. with each of the organisms listed below, the cultures were then replanted on the blood agar plates prior to a second incubation at about 37° C. for about 24 hours. The three organisms utilized were present at a level of 15 million per 1 milliliter and were:

| | |
|---|---|
| Staphylococcus aureus | ATCC 25923 |
| Escherichia coli | ATCC 35933 |
| Pseudomonas aeruginosa | ATCC 27853. |

With the organisms tested individually in controlled studies, the propolis was found to have the following effects. Purified propolis powder in the final concentration of 2 milligrams per milliliter is lethal to *Staphylococcus aureus*. Purified propolis powder in a final concentration of 6 milligrams per milliliter is lethal to *Escherichia coli*. Purified propolis powder in a final concentration of 5 milligrams per milliliter is lethal to Pseudomonas aeruginosa.

Similar experimentation was performed utilizing water soluble propolis powder obtained in accord with the method of Example IV. The bactericidal activity of this propolis was equivalent to that just stated above.

EXAMPLE XXVIII

The following procedures were followed in order to determine the antioxidative properties of water soluble dry propolis powder obtained in accord with the procedures of Example IV. 250 micrograms of the water soluble dry propolis powder were dissolved in 1 ml of distilled water. To this was added 0.02 ml of 0.1 N potassium permanganate. Decolorization took place in approximately 2.1 seconds giving a positive indication of the antioxidative properties of the water soluble dry propolis powder. These results are deemed important for the reason that the antioxidative properties of the propolis powder correlate to its bactericidal efficacy.

Dry propolis powder obtained in accord with the method of this invention is considered as a storage material available for immediate use. It is believed that the stability of the propolis powder, when stored in an amber glass container at room temperature, is at least 10 years. The propolis powder is soluble in all the solvents mentioned in the methods given in the above examples including, obviously, water. Furthermore, organic propolis solutions are also soluble in glycerol and many chemical surfactants used in the pharmaceutical, cosmetic and food industries. Similarly, organic solutions of propolis powder are readily miscible with castor oil. The incorporation of organic solutions of propolis powder and different vegetable oils can be achieved first through the combination of the organic solution with castor oil or with chemical surfactants. Mineral oil, after combination with vegetable oil, creates suitable conditions for the addition of organic propolis solutions. Similar results can be achieved through the combination of organic propolis solutions with chemical surfactants and then with mineral oil.

Use of the dry propolis powder in organic or aqueous solutions, creams, lotions, suppositories, douches or in other pharmaceutical or cosmetic bases possess significant antibacterial, antifungal and antiviral activity. The observed antiviral activity of the dry propolis powder is particularly significant, and has been observed to be effective againt Herpes simplex (type 1), Herpes simplex (type 2), Zoster virus, Epstein Barr virus and common cold viruses. Infectious hepatitis and distemper have not as yet been investigated, but theoretical considerations strongly indicate the efficacy of the extracted dry propolis powder.

In relatively large concentrations propolis extracted according to the method of this invention possesses anesthetic properties. Large concentrations also enhance animal tissue metabolism and may be applied locally to increase blood circulation. The increase in tissue metabolism during the treatment indicates that the stimulated tissue may react against inflammatory processes and that the propolis possesses regenerative properties. Increased blood circulation in local tissue is an important factor in combatting cellulites, cramps and other conditions. As will be indicated below, the oral application of 5 to 10% propolis powder in absolute ethanol has proved to be effective for bacterial, fungal and viral diseases.

Of particular note is the efficacy of such solutions in the treatment of Herpes simplex (types 1 and 2). Herpes simplex (type 1) is spread by contact of the mucous membranes which results in cold sores. Herpes simplex (type 2) infections are spread by sexual contact, and are considered as the most common venereal disease in the United States. It is generally accepted that Herpes simplex (type 2) is linked with cervical cancer. Both of the Herpes viruses can cause encephalitis which has a high mortality rate. Propolis powder prepared in accord with the method of this invention and applied in the form of creams or ointments rapidly cures cold sores. Herpes simplex (type 2) infections of the sex organs can be cured by a specially applied douche. In both cases, subsequent oral treatment is recommended in order to prevent recurrence of the diseases.

In vitro studies of Herpes simplex (types 1 and 2) have demonstrated that about 10 micrograms of the propolis powder per milliliter of the culture media kills the viruses without affecting cell division. Oral administration in dosages of about 2 to 3 grams per day will prevent further outbreaks.

It should also be noted that the dry propolis powder obtained in accord with the method of this invention has been observed to be extremely efficacious against the majority of common cold viruses when treated immediately after the first symptoms of the cold appear (no later than 2 or 3 hours after the onset of the condition). When the propolis is taken more than about 3 hours after symptoms appear, the severity of the symptoms do appear to diminish.

The following examples, then, are given for the purpose of illustrating various formulations for topical and oral administration of the dry propolis powder.

EXAMPLE XXIX

Petrolatum Propolis Ointment

A 0.5 to 5.0% propolis-ethanol solution may be incorporated into white or yellow petrolatum in concentrations up to 60%, by volume, propolis solution. To decrease the viscosity of this and other ointments, mineral oil, wool fats, animal fats or fish fats can be used.

EXAMPLE XXX

Spermaceti Cream

The following ingredients are mixed to obtain the cream, with all composition constituents listed in weight percents:

| Polyoxyethylene 20 sorbitan monostearate | 8.0% |
|---|---|
| Propolis powder | 2.0% |
| Sorbitan monostearate | 8.0% |
| Spermaceti | 10.0% |
| Water q.s. ad | 100.00%. |

EXAMPLE XXXI

Anti-Herpes Cream 1

The following formulation, with constituents listed in weight percents, has proved to be effective in treating Herpes viruses:

| Propolis powder | 1.0–5.0% |
|---|---|
| Dermabase q.s. ad | 100.0%. |

Dermabase is a hypo-allergenic cream base which is compatible with most medicaments. Its pH is close to that of human skin. Dermabase is a vehicle for topical application used in pharmaceutical, cosmetic and veterinary preparations. It is manufactured by Professional Pharmaceutical Corporation, 2795 Bates Road, Montreal, Quebec H3S 1B6, Canada.

EXAMPLE XXXII

Anti-Herpes Cream 2

The following formulation with constituents listed in weight percents, has proved to be effective in treating Herpes viruses:

| Propolis powder | 0.5–10.0% |
|---|---|
| Unibase q.s. ad | 100.0%. |

Unibase is a dermatological all-purpose base, and has a pH approximating that of the skin. Unibase is manufactured by Parke-Davis & Company, Ltd., Box 633, Station "A", Scarborough, Ontario M1K 5C5, Canada.

EXAMPLE XXXIII

Suppositories

The propolis powder prepared in accord with the method of this invention may be administered in suppositories prepared in accord with the following formula wherein all constituents are listed in weight percents:

| Polyoxyethylene 20 sorbitan monostearate | 35.0–55.0% |
|---|---|
| Polyoxyethylene 4 sorbitan monostearate | 40.0–60.0% |
| Propolis powder | 1.0–5.0% |

EXAMPLE XXXIV

Suppositories

Yet another formulation for suppositories including powdered propolis may be prepared as follows, again with all constituents listed in weight percents:

| Glyceryl laurate | 6.0–16.0% |
|---|---|
| Polyoxyethylene 4 sorbitan monostearate | 82.0–92.0% |
| Propolis powder | 2.0%. |

EXAMPLE XXXV

Oral Preparations

A liquid (syrup) preparation for the oral administration of propolis powder may be prepared according to the following formula:

| Polyoxyethylene 20 sorbitan monooleate | 60 grams |
|---|---|
| 50% Propolis ethanol solution | 30 grams |
| Propylene glycol | 100 grams |
| Ethyl alcohol | 100 grams |
| 70% aqueous sorbitol solution, USP | 300 grams |
| Distilled water | 410 grams. | flavoring agents and/or preservatives may be included as desired.

The following examples are presented for the purpose of setting forth propolis-containing solutions which have proved to be efficacious for treating the common cold.

EXAMPLE XXXVI 10 milliliters (approximately 1 tablespoon) of about 10% propolis-ethanol solution are mixed in a glass (about 8 ounces) of water or juice. Alternatively, the propolis-ethanol solution may be mixed with coffee or tea giving the appearance of added milk.

This mixture may be taken about 3 times a day, but if first administered immediately after the first symptoms are noted, the symptoms may disappear within a few hours.

EXAMPLE XXXVII

Nasal Ointment for Cold or Hay Fever

| | |
|---|---|
| Petrolatum | 96.0 grams |
| 50% Propolis-ethanol solution | 4.0 grams |

This ointment should be applied to the nostrils a few times daily as required. Other similar bases may be substituted for the petrolatum.

EXAMPLE XXXVIII

Honey-Propolis Formula

| | |
|---|---|
| Honey | 80.0–90.0 grams |
| 25% Propolis in concentrated propylene glycol, USP | 10.0–20.0 grams |

EXAMPLE XXXIX

Gelatin Capsules

| | |
|---|---|
| Sorbitol solution, USP | 80.0–90.0 grams |
| 25% Propolis in concentrated propylene glycol, USP | 10.0–20.0 grams |

The above is only one example of many possible means of incorporating propolis into capsules. The propylene glycol USP potentiates the activity of alcoholic propolis solutions up to 6.5 fold with respect to cidal activities versus numerous microorganisms.

It has also been determined that propolis obtained in accord with the methods of this invention is useful in the treatment of respiratory tract infections and inflammatory processes of the lungs, including bronchial asthma, sinusitis and hay fever. One means of treatment is inhalation therapy in which the drug is dissolved in hot water, and the vapors are inhaled according to conventional procedures. The following example sets forth a formula and procedure for the inhalation of propolis.

EXAMPLE XL

About 10 milliliters (approximately 1 tablespoon) of 10% alcoholic solution of propolis is added to about 1 liter of hot water and mixed well. The vapors are inhaled.

EXAMPLE XLI

Yet another formulation for inhalation therapy may be prepared as follows:

| | |
|---|---|
| 50% propolis-ethanol solution | 10 grams |
| Gum Benzoin | 8 grams |
| Storax | 6 grams |
| Tolu balsam | 2 grams |
| Aloe | 2 grams |

The above is blended into 100 milliliters of 90% ethanol. In a preferred use, 1 teaspoon of this mixture is added to 500 milliliters of hot water to produce the inhalation solution.

Other solvents of propolis for inhalation therapy include benzyl alcohol and polyethylene glycol.

In studies of asthma, in experimental animals it has been determined that polyethylene glycol may be used as a solvent for propolis in the formulation of injectable preparations (intramuscular).

As indicated above in Example XXXIX, propolis in gelatin capsules with suitable non-ionic surfactants such as, for example, polyoxyethylene 20 sorbitan monostearate, can be used in the treatment of gastrointestinal tract infections, ulcers and other inflammatory disorders of the bowel. Treatment can be achieved with the oral application of propolis in conjunction with non-ionic surfactants and propylene glycol in the form of gelatin capsules. Yet another treatment form comprises the use of retention enemas including propolis.

The gelatin capsules should be formulated to maximize the absorption of propolis in the gastrointestinal tract. This can be achieved by mixing the propolis-ethanol solution with sorbitol or diluted propylene glycol solution until a milky appearance of the combined substances results. This will avoid or minimize coating of the gastric mucosa.

The daily intake of propolis should range within about 3–6 grams. The retention enemas should be given in quantities of about 200 milliliters three times a week or according to a physician's directions. The pH of the enema solution should be between 5.0 and 6.0. The concentration of propolis may vary from about 5 to about 10 percent.

It has also been determined that the propolis can be mixed with concentrated propylene glycol USP and incorporated in the gelatin capsules which, when ingested, can coat the stomach walls. The capsules in contact with gastric juice will form a milky suspension which adsorbs over the surface of the stomach cells forming a thin film. This coating has been shown to suppress the appetite for 2 to 3 hours, and such treatment is recommended for the control of weight in obese patients.

Vaginitis, cervicitis and cervical erosions may be treated with 1 to 5% propolis-ethanol solution in combination with glycerine, propylene glycol and with or without non-ionic surfactants in the form of douches, suppositories or ointments.

Propolis powder can be used in otolaryngology and renal infections in the form of solutions, tablets or capsules.

Propolis powder can be incorporated into ointments for the treatment of burns.

For cystic fibrosis the daily oral application of one gram of propolis powder should be administered in the form of capsules or solutions.

Patients with leukocyte dysfunction disorders often develop recurrent bacterial infections which cannot be controlled by current methods of therapy. Propolis powder solutions, being strong bactericidal agents, can be used orally in the treatment of these disorders. The oral application of propolis powder solutions in a daily dose of 2 to 3 grams calculated on an anhydrous basis for a period of ten days is recommended. They can also be used in conjunction with current antibiotic therapy.

The regenerative and rejuvenating properties of propolis powder can be used in areas of medical science such as plastic surgery and dental surgery. Propolis powder in the form of ointments, creams, lotions, solutions, shampoos, cream rinses, shaving lotions and scalp creams in contact with the damaged or diseased lesion on the animal or human body shows considerable healing and rejuvenating properties. These regenerative properties of propolis powder can be observed in dental surgery, plastic surgery of animal organs and also in vitro tissue culture studies.

When propolis powder solutions are added to a fibroblast cell culture, the number of mitotic cells increases. Such studies demonstrate an increase in the enzymes responsible for the increased metabolism within the cell. The increased enzyme activity occurs with the following enzymes:

Adenosine triphosphatase
Acid phosphatase
Glucose-6-phosphatase
Succinate dehydrogenase This may explain why propolis powder solutions show regenerative properties such as the increase in the activity of formation of a collagen.

Propolis powder may be consistently employed in conjunction with other antibacterial agents used in dentistry. Propolis powder incorporated in suitable bases will control superficial and deep infections of the mucous membranes and bone, and will disinfect tooth cavities or root canals.

Propolis powder solutions used alone or in combination with benzocaine is an excellent anaesthetic. An illustrative formula follows.

EXAMPLE XLII

Propolis Benzocaine Solution

| Ethyl aminobenzoate | 7.5 grams |
|---|---|

Propolis powder in propylene glycol to make 150 milliliters.

The final concentration of propolis in the above formula may vary from 1.0 to 10.0%, by weight.

Propolis powder may be used in the form of liquids or pastes to relieve post extraction pain (alveolar analgesic). An example of a paste follows.

EXAMPLE XLIII

Propolis Benzocaine Paste

| Lanolin alcohols | 10.0 grams |
|---|---|
| Yellow beeswax | 10.0 grams |
| Petrolatum | 10.0 grams |
| Ethyl aminobenzoate | 2.0 grams |
| Clove oil | 3.0 grams |
| 50% Propolis ethanol solution | 15.0 grams |

Propolis in the above formula acts as antimicrobial, analgesic, anaesthetic and regenerative agents. It speeds regeneration of the tissues and reduces inflammatory infiltrations.

EXAMPLE XLIV

Propolis in a Mouth Rinse Solution

| 2–10% Propolis in alcohol-glycerol solution | 40.0%, by volume |
|---|---|
| Propylene glycol | 10.0%, by volume |
| Distilled water | 49.8%, by volume |
| Flavoring agent | 0.2%, by volume |

In this formula sorbitol USP or non-ionic surfactants may be used. Propolis powder has wide ranging applications in the treatment of dermatological disorders. Propolis powder for this purpose can be incorporated into ointments, creams, lotions, solutions, shampoos, cream rinses, douche and oral preparations. Propolis powder can also be incorporated into currently used pharmaceutical and cosmetic products directly or with suitable surfactants.

Ringworm may be treated by the local application of 10% propolis-alcohol solution or 5 to 10% propolis powder in an ointment made of petrolatum or another base two to three times daily for four weeks, or until symptoms are no longer evident.

Psoriasis, seborrheic dermatitis, eczema and neurodermatitis may be successfully treated with from 0.5 to 25% propolis powder in the form of lotions, solutions or ointments prepared with bases as previously described.

Propolis powder in concentrations from 0.5 to 10.0% may be formulated with wool fat or its alcohols and in combination with petrolatum and mineral oil for treating corns, warts and calluses.

Propolis concentrations of from 0.25 to 1.0% combined with non-ionic surfactants and incorporated into shampoos, cream rinses or creams are efficacious for treating dandruff. Similarly, propolis solutions in concentrations varying from 0.25 to 2.0% may be incorporated into hypoallergenic bases for treating poison ivy and jellyfish dermatitis.

Acne vulgaris may be treated with up to 3% propolis solutions combined with up to 3% salicylic acid, non-ionic surfactants such as polyoxyethylene 20 sorbitan monolaurate and with 40% ethyl alcohol or another suitable alcohol. Other compounds can also be used such as methyl salicylate, glycerine, or propylene glycol.

A most effective treatment for hematomas and other bruises consists of about 2–5% propolis-ethanol solution made into an ointment with petrolatum. The ointment is spread on the bandage, which is then taped over the affected area.

The unique properties of propolis have been used to create a new range of cosmetics. Propolis powders and solutions are endowed with preservative and antioxidant properties and natural skin rejuvenating properties which are indispensible to the many cosmetic preparations. The concentration of propolis in its powdered form can vary from less than 1% to greater than 2%. As a preservative or an antibacterial and antifungal agent propolis solutions may be used in concentrations varying from 1.0 to 2.0% on an anhydrous basis. In antiwrinkle preparations the percentage of propolis powder can be increased. The rejuvenating and other properties of propolis in trials of a number of cosmetic formulas have fulfilled expectations.

Propolis powders may be used in moisturizers, night and day creams, nutrient creams, barrier creams, cuticle creams, cleansing creams, lotions, cold creams, mask preparations, all types of lotions and solutions, shampoos, conditioners, cream rinses, shaving lotions, finger nail polish, soaps, lipsticks, baby creams, baby lotions, anti-diaper rash products, massage creams, massage lotions, skin rubbing products, aerosols for cosmetic or medical purposes, keratolytic (desquamating) products and anti-cellulite products.

Moisturizing creams are used during the day under makeup or as a foundation cream endowing the skin with a soft appearance, retaining its moisture and preventing wrinkles. An acceptable formulation for such a moisturizing cream follows:

EXAMPLE XLV

| Cream base | 78.0 grams |
|---|---|
| Propylene glycol | 10.0 grams |
| Avocado oil | 10.0 grams |
| 50% Propolis solution | 2.0 grams |

Propylene glycol may be substituted with glycerol, sorbitol solution USP or lanolin. Avocado oil may be substituted with another vegetable oil, or an animal or fish fat.

EXAMPLE XLVI

Cold Creams

These contain large amounts of fatty or oil ingredients. An example follows:

| Cream base | 40.0 grams |
|---|---|
| Oil or fat | 58.0 grams |
| 50% Propolis solution | 2.0 grams |

EXAMPLE XLVII

Night Cream

| Cream base | 70.0 grams |
|---|---|
| Oil or fat | 27.0 grams |
| 50% Propolis solution | 3.0 grams |

The increased quantity of propolis is an important factor in the rejuvenation of the skin during the night when the mitotic activity of the skin is increased. Humectants may be added to aid in retaining skin moisture.

EXAMPLE XLVIII

Cuticle Cream

This softens the cuticles and prevents the nails from becoming brittle. It actually toughens and thickens the nails permitting them to be grown longer. A formula follows:

| Petrolatum-lanolin base | 97.0 grams |
|---|---|
| 50% Propolis solution | 3.0 grams |

EXAMPLE XLVIV

Facial Masks

Facial masks are intended as skin cleansing and tightening agents. The presence of propolis aids in rejuvenating the skin. The following is one example of a facial mask:

| Fuller's earth | 50.0%, by volume |
|---|---|
| 50% Glycerol solution | 44.0%, by volume |
| 50% Propolis solution | 5.7%, by volume |
| Perfume, if desired | 0.3%, by volume |

China clay, kaolin or bentonite may also be used in combinations with or as a replacement of the Fuller's earth used above.

Propolis powder may also be used in liniments in conjunction with oil of turpentine, capsicum, extracts or arnica, linseed oil, camphor and isopropyl alcohol, etc.

As previously indicated, propolis powder and propolis solutions may be used as preservatives, anti-oxidants, stabilizers and rejuvenating agents in a variety of current cosmetic products. Their incorporation would require only slight modifications of the original formulas. The propolis may be directly incorporated or via the use of a solvent or surfactant. The surfactants can be non-ionic, anionic or cationic.

Propolis powder and solutions may also be used in the food industry as preservatives, anti-oxidants and stabilizers of food products, with emphasis on preserving animal and fish fats. In the distilling industries they can be incorporated into alcohol for use in oral treatment of patients. In the tobacco industry it is believed they can be used as a flavor or as a medicated agent in anti-asthmatic cigarettes.

It should also be noted that the following solvents, because of their chemical equivalency to the solvents previously described, could also be used in the method of this invention:

Amyl alcohol
Isoamyl alcohol
Phenetyl alcohol
Ethylene glycol ethyl ether
Isoamyl benzoate
Isoamyl butyrate
Isoamyl formate
Isoamyl isovalerate
Isoamyl salicylate
Formamide.

In similar fashion, it is anticipated that other, equivalent organic compounds which are solvents for resins and balsams may be used in the method of this invention.

Briefly summarizing, then, it can be seen that the present invention presents a unique method for preparing dry propolis powders which are suitable for a wide variety of end use applications. It is to be emphasized that the method and resulting water soluble propolis powder is deemed quite significant for the reason that heretofore water soluble forms of propolis were not known.

It will thus be seen that the objects set forth above, among those made apparent from the preceeding description, are efficiently attained and since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the inventions which, as a matter of language, might be said to fall therebetween.

Now that the invention has been described,
What is claimed is:

1. A method for extracting propolis, said method comprising the steps of:
   a. selecting a quantity of raw material from the group consisting of raw propolis and unprocessed beeswax;
   b. placing said quantity of raw material in a container and covering said quantity with solvent wherein about 1-1.5 liters of said solvent are added per 500 g of said quantity, and wherein said solvent is selected from the group consisting of ethyl alcohol, isopropyl alcohol, n-butyl alcohol, sec-butyl alcohol, tert-butyl alcohol, ethyl ether, benzyl alcohol, propylene glycol, dimethyl sulfoxide, ethylene glycol, n-propyl alcohol, methyl alcohol, benzyl benzoate, acetone, polyethylene glycol, glacial acetic acid, aqueous solutions of said solvents, and mixtures thereof;
   c. maintaining the mixture of step b. at a temperature of about 0°-37° C. for about 1-10 days with periodic agitation to obtain a propolis-containing solution;
   d. filtering said solution to obtain a propolis-containing filtrate; and
   e. removing said solvent from said filtrate to obtain a dry propolis powder.

2. A method as in claim 1 wherein said removal of said solvent comprises lyophilization and wherein said solvent consists essentially of no more than about 25% aqueous solutions of said solvents.

3. A method as in claim 1 wherein said removal of said solvent comprises incubation at about 55°-70° C. until dry.

4. A method as in claim 3 comprising incubation at about 70° C.

5. A method as in claim 1 further comprising purification of the propolis wherein said purification comprises:
   d(1). cooling said propolis-containing filtrate to a temperature of at most about −20° C.;
   d(2). maintaining said cooled filtrate at said temperature for about 24 hours;
   d(3). agitating said cooled filtrate;
   d(4). filtering said cooled filtrate while maintaining said temperature to obtain a purified propolis-containing filtrate; and
   e. removing said solvent from said purified filtrate to obtain a purified dry propolis powder.

6. A method as in claim 5 wherein said removal of said solvent comprises incubation at about 55°-70° C. until dry.

7. A method as in claim 6 comprising incubation at about 70° C.

8. A method as in claim 5 wherein said removal of said solvent comprises lyophilization and wherein said solvent consists essentially of no more than about 25% aqueous solutions of said solvents.

9. A method for extracting and purifying propolis, said method comprising the steps of:
   a. selecting a quantity of raw material consisting essentially of raw propolis;
   b. placing said quantity of raw material in a container and covering said quantity with solvent wherein about 1-1.5 liters of said solvent are added per 500 g of said quantity, and wherein said solvent is selected from the group consisting of ethyl alcohol, isopropyl alcohol, n-butyl alcohol, sec-butyl alcohol, tert-butyl alcohol, ethyl ether, benzyl alcohol, propylene glycol, dimethyl sulfoxide, ethylene glycol, n-propyl alcohol, methyl alcohol, benzyl benzoate, acetone, polyethylene glycol, glacial acetic acid, aqueous solutions of said solvents, and mixtures thereof;
   c. maintaining the mixture of step b. at a temperature of about 0°-37° C. for about 1-10 days with periodic agitation to obtain a propolis-containing solution;
   d. filtering said solution to obtain a propolis-containing filtrate;
   e. cooling said propolis-containing filtrate to a temperature of at most about −20° C.;
   f. maintaining said cooled filtrate at said temperature for about 24 hours;
   g. agitating said cooled filtrate;
   h. filtering said cooled filtrate while maintaining said temperature to obtain a purified propolis-containing filtrate; and
   i. removing said solvent from said purified filtrate to obtain a purified dry propolis powder.

10. A method as in claim 9 wherein said removal of said solvent comprises incubation at about 55°-70° C. until dry.

11. A method as in claim 10 comprising incubation at about 70° C.

12. A method as in claim 9 wherein said removal of said solvent comprises lyophilization and wherein said solvent consists essentially of no more than about 25% aqueous solutions of said solvents.

13. A method as in claim 9 further comprising verification of the purity of said purified propolis-containing filtrate wherein said verification comprises:
   h(1). cooling said purified propolis-containing filtrate to a temperature of at most about −70° C.;
   h(2). maintaining said purified propolis-containing filtrate at said temperature for about 24 hours;
   h(3). observing the clarity of said purified propolis-containing filtrate, wherein substantial clarity after said time period indicates purity of the final product; and
   i. removing said solvent from said purified filtrate to obtain a purified dry propolis powder.

14. A method for obtaining a water soluble propolis powder, said method comprising the steps of:
   a. selecting a quantity of raw material consisting essentially of raw propolis;
   b. placing said quantity of raw propolis in a container and covering said quantity with solvent wherein about 1 liter of said solvent is added per 500 g of said quantity, and wherein said solvent is selected from the group consisting of 10-25% aqueous solutions of ethyl alcohol, isopropyl alcohol, sec-butyl alcohol, tert-butyl alcohol, ethyl ether, propylene glycol, dimethyl sulfoxide, ethylene glycol, n-propyl alcohol, methyl alcohol, acetone, polyethylene glycol, glacial acetic acid, and mixtures thereof;
   c. maintaining the mixture of step b. at a temperature of about 0°-37° C. for about 1-10 days with periodic agitation to obtain a propolis-containing solution;
   d. filtering said solution to obtain a propolis-containing filtrate; and e. removing said solvent from said filtrate to obtain a water soluble dry propolis powder.

15. A method as in claim 14 wherein said solvent consists essentially of a 10–25% aqueous solution of ethyl alcohol.

16. A method as in claim 15 wherein said solvent consists essentially of a 15% aqueous solution of ethyl alcohol.

17. A method as in claim 15 wherein said removal of said solvent comprises lyophilization.

18. A method as in claim 15 wherein said removal of said solvent comprises incubation at about 55°–70° C. until dry.

19. A method as in claim 18 comprising incubation at about 70° C.

20. A water soluble dry propolis powder prepared in accord with the method of claim 14.

* * * * *